United States Patent [19]

Wahoski

[11] 4,116,477

[45] Sep. 26, 1978

[54] CONNECTOR, REDUCER/ADAPTER, FLARE TO FLARELESS

[75] Inventor: Ernest C. Wahoski, Harper Woods, Mich.

[73] Assignee: The United States of America as represented by the Secretary of the Army, Washington, D.C.

[21] Appl. No.: 759,299

[22] Filed: Jan. 14, 1977

[51] Int. Cl.² ............................................. F16L 55/00
[52] U.S. Cl. .................................. 285/169; 285/177; 285/175; 285/386
[58] Field of Search ..................... 285/169, 177, 334.5, 285/175, 382.7, 386

[56] References Cited

U.S. PATENT DOCUMENTS

| 2,185,725 | 1/1940 | Elliott | 285/177 X |
| 2,391,266 | 12/1945 | Parker | 285/334.5 X |
| 3,381,980 | 5/1968 | Smith | 285/334.5 X |
| 3,502,355 | 3/1970 | Demler et al. | 285/177 X |
| 3,704,035 | 11/1972 | Mayer | 285/334.5 X |

*Primary Examiner*—Wayne L. Shedd
*Attorney, Agent, or Firm*—Peter A. Taucher; John E. McRae; Nathan Edelberg

[57] ABSTRACT

A high pressure fluid pipe connector for joining a threaded pipe to a smooth-walled tube; the connector also acts as a flow reducer. Special features of the connector are minimum number of parts, smooth continuous fluid surface contours, and relatively short compact connector length.

3 Claims, 2 Drawing Figures

CONNECTOR, REDUCER/ADAPTER, FLARE TO FLARELESS

BACKGROUND AND SUMMARY OF THE INVENTION

In some fluid systems it is necessary or desirable to provide transition connection from a large diameter threaded pipe to a small diameter smooth-walled tube. In systems with which applicant is familiar, the transition is accomplished by a relatively large number of threaded couplings, seals and intermediate tubes. The present invention relates to a transition connector employing a minimum number of component parts.

THE DRAWINGS

Figure 1:
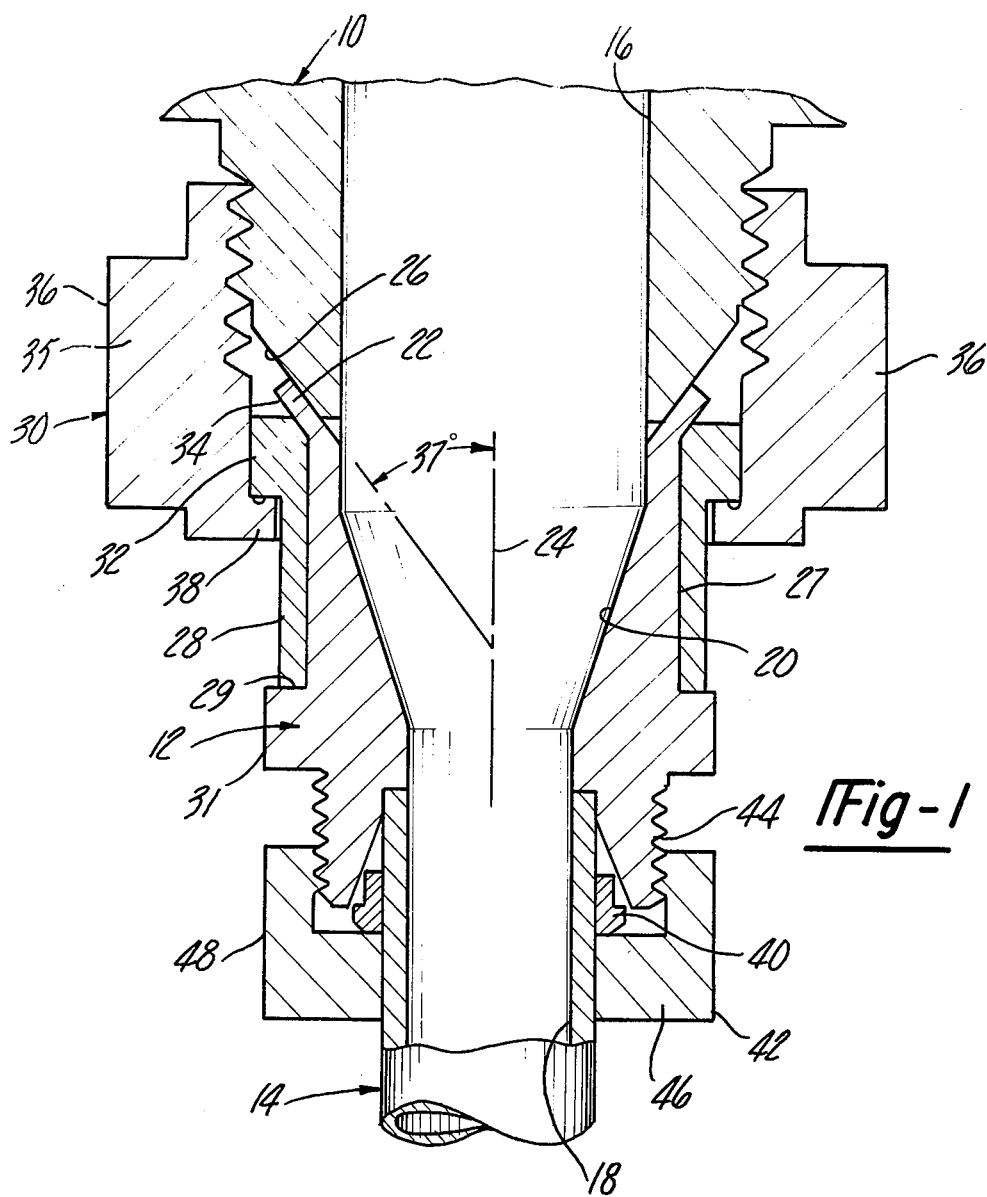
FIG. 1 is a sectional view through a connector mechanism embodying this invention.

FIG. 1 illustrates a fluid pressure system comprising an externally threaded fitting or pipe 10, connector body 12, and smooth-walled tube 14. Fitting 10 defines a relatively large diameter fluid passage 16, whereas tube 14 defines a smaller diameter passage 18; the connector body 12 defines a tapering or frusto-conical passage 20 for effecting a relatively smooth non-turbulent transition from the large diameter passage 16 to the small diameter passage 18. Members 10, 12 and 14 may each be metal (ferrous or non-ferrous) or plastic as required for different environmental conditions in chemical or food processing industries.

Connector body 12 may be a one piece screw machine part having an annular flange 22 at its upper end accutely angled outwardly relative to the connector body axis 24 at approximately thirty seven degrees. This angularity is selected to be the same as the included angle of the frusto-conical end surface 26 on the lower end of fitting 10. The connector body 12 is pressured tightly against conduit surface 26 by means of a sleeve 28 and nut 30. As shown, sleeve 28 includes a radially thickened annular head 32 engaged with an external frusto-conical surface area 34 on flange 22. Nut 30 comprises a main body 35 having wrench flats 36 and an inwardly-extending lip 38 underlying the head 32 of the sleeve 28, whereby threading of the nut 30 onto the fitting 10 causes the annular lip 38 to apply pressure on head 32, thereby enabling the head to force flange 22 tightly against end surface 26 of the fitting; this establishes a sealed joint maintainable at relatively high fluid pressures. In an actual assembly using ferrous components the joint was maintained in a sealed condition under pressures in excess of 700 p.s.i.

The joint between connector body 12 and tube 14 is sealed or completed by means of a conventional soft metal ring 40 and annular cap 32. As seen in FIG. 1, this joint is in the "loose" state prior to the final tightening-down operation. The upper end of tube 14 fits snugly within a cylindrical socket machined into the lower end of connector body 12. A flared entrance mouth 44 for this socket accommodates a soft metal ring 40 above the end wall 46 of cap 42. Wrench flats 48 on the cap side wall permit the cap to be threaded onto the end area of connector body 12 thereby deforming ring 40 and moving the ring material upwardly through mouth 44 into a trapped pressurized condition between tube 14 and mouth 44 surface; the wall of tube 14 may be slightly deformed or indented during this operation.

Figure 2:
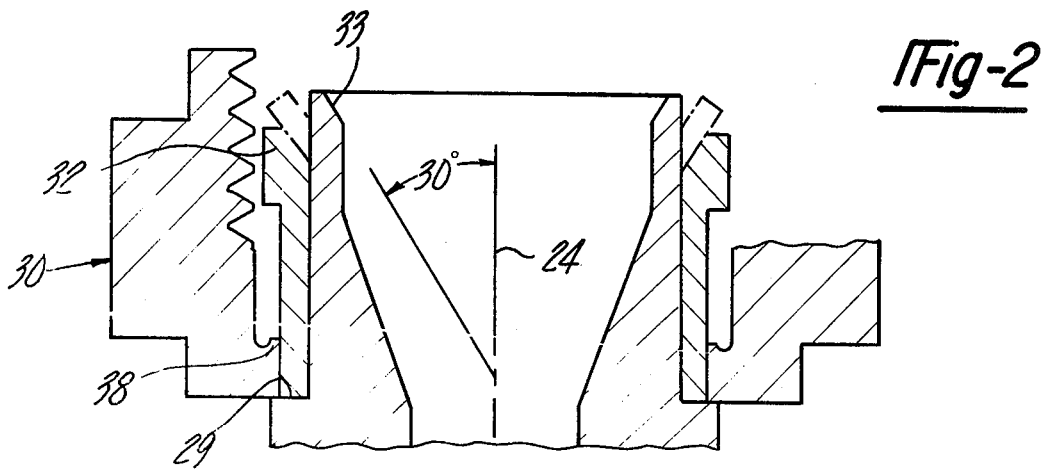
FIG. 2 is a fragmentary sectional view of the FIG. 1 connector mechanism in a partially manufactured state.

It will be seen from FIG. 1 that sleeve 28 is captively retained or trapped between shoulder 29 formed by the protruding wrench flats 31 and the accutely angled flange 22. Initial assembly of sleeve 28 is necessarily accomplished prior to the step of forming flange 22. FIG. 2 illustrates the conditions of connector body 12, sleeve 28, and nut 30 prior to formation of flange 22. With the parts stacked together as shown in FIG. 2, a flared die or punch (not shown) is moved or stroked downward axially against the machined chamfer surface 33 to deform the upper annular end area of the connector body outwardly to the final configuration shown in FIG. 1; the chamfer reduces the amount of material stress and strain during the die-formation operation, and also therefore the tendency for undesired cracking of flange 22. The machined angle of chamfer 33 is about thirty degrees. During the deformation step the shoulder 29 supports the sleeve 28 in a fixed position on the connector body 12; the annular head area 32 of the sleeve has an upper surface that is angled at thirty seven degrees relative to body axis 24 to thereby limit the flange 22 deformation and thus determine the angularity of the flange internal surface. This action produces a precision fit of flange 22 on the frusto-conical end surface 26 of fitting 10. When connector body 12 is formed of thermoplastic material the die is preferably heated to relieve stresses that would otherwise occur during a cold-forming operation.

The illustrated assembly is believed to have several advantages. For example, the defined flow passage comprised of surfaces 16, 20 and 18 is relatively smooth without abrupt cavities or projections that would produce turbulence losses. Also, the entire intermediate section of the connector body 12 is internally tapered, as at 20, so that a relatively great flow reduction is achieved with a relatively short connector body 12; this could be important where the flow reducer must be accommodated in a limited space.

Of some practical importance is the fact that sleeve 28 and nut 30 are loosely trapped on the connector body 12 in the pre-usage state. The technician is therefore able to build up a complete pipe system without having to rummage through a large number of separated components; the connector body, sleeve and nut are in effect pre-assembled.

The drawings illustrate one practical embodiment of the invention but it will be appreciated that minor changes and variations can be resorted to without departing from the spirit of the invention as set forth in the appended claims.

I claim:

1. In the combination comprising an externally threaded pipe (10) defining a large diameter fluid passage (16), said pipe having an external frusto-conical end surface (26); and a smooth-walled tube 14 having a cylindrical end section defining an internal passage (18) of appreciably smaller diameter than the aforementioned fluid passage (16);

the improvement comprising means for connecting the tube to the pipe in fluid-tight fashion, said connecting means including a one-piece annular connector body (12) having a first end section that defines a large diameter passage constituting a smooth continuation of the aforementioned passage (16), a second end section defining a small diameter passage constituting a smooth continuation of the aforementioned smaller passage (18), and an intermediate section defining a tapering passage merging smoothly with the large and small diameter passages;

the first end section of the connector body including an annular flange (22) angled acutely outwardly relative to the connector body axis to define an internal frusto-conical surface (33) matable with the frusto-conical end surface (26) on the pipe, said annular flange also defining an external frusto-conical surface (34);

means pressuring the connector body flange (22) against the pipe end surface, comprising a sleeve (28) encircling the connector body and a sleeve-engaged nut (30) threaded onto the pipe to draw the sleeve and connector body toward the pipe end surface;

said second end section of the connector body having a cylindrical socket therein snugly fitting around the cylindrical end section of the aforementioned tube (14), the mouth of the cylindrical socket being flared to define an annular cavity surrounding the tube;

a sealing ring (40) seated within said cavity, and an annular cap (48) threaded onto the second end section of the connector body to compressively pack the sealing ring into the annular cavity.

2. The combination of claim 1: said connector body (12) having an outwardly extending wall that defines wrench flats (31) and a shoulder (29); the aforementioned sleeve being positioned on the connector body between said shoulder and the aforementioned flange (22).

3. The combination of claim 2 wherein said sleeve includes a radially thickened head (32) engaged with said external frusto-conical surface (34); said nut (30) including an inwardly-extending lip (38) underlying said thickened head to apply axial pressure thereon when the nut is threaded onto the pipe.

* * * * *